(12) United States Patent
Gray et al.

(10) Patent No.: US 8,812,796 B2
(45) Date of Patent: Aug. 19, 2014

(54) PRIVATE MEMORY REGIONS AND COHERENCE OPTIMIZATIONS

(75) Inventors: Jan Gray, Bellevue, WA (US); David Callahan, Seattle, WA (US); Burton Jordan Smith, Seattle, WA (US); Gad Sheaffer, Haifa (IL); Ali-Reza Adl-Tabatabai, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 593 days.

(21) Appl. No.: 12/493,164

(22) Filed: Jun. 26, 2009

(65) Prior Publication Data

US 2010/0332771 A1     Dec. 30, 2010

(51) Int. Cl.
*G06F 12/00*     (2006.01)
*G06F 13/00*     (2006.01)
*G06F 13/28*     (2006.01)
*G06F 9/46*     (2006.01)

(52) U.S. Cl.
USPC ........... 711/148; 711/141; 711/144; 711/145; 711/119; 711/130; 711/147; 711/118; 718/102

(58) Field of Classification Search
None
See application file for complete search history.

(56) References Cited

U.S. PATENT DOCUMENTS

| | | | |
|---|---|---|---|
| 4,442,487 A * | 4/1984 | Fletcher et al. | ............... 711/122 |
| 5,394,555 A | 2/1995 | Hunter | |
| 5,404,555 A | 4/1995 | Liu | |
| 5,428,761 A * | 6/1995 | Herlihy et al. | ................ 711/130 |
| 5,768,500 A | 6/1998 | Agrawal | |
| 5,835,764 A | 11/1998 | Platt | |
| 5,933,632 A | 8/1999 | Cahill, III | |
| 6,272,607 B1 | 8/2001 | Baentsch et al. | |
| 6,314,563 B1 | 11/2001 | Agesen | |
| 6,665,704 B1 | 12/2003 | Singh | |
| 6,751,617 B1 | 6/2004 | Anfindsen | |
| 6,842,830 B2 | 1/2005 | Khare | |
| 6,845,430 B2 | 1/2005 | Hopeman | |
| 6,862,635 B1 | 3/2005 | Alverson | |
| 6,871,264 B2 | 3/2005 | Soltis | |
| 6,898,609 B2 | 5/2005 | Kerwin | |
| 6,938,128 B1 * | 8/2005 | Kuskin et al. | ................. 711/141 |

(Continued)

OTHER PUBLICATIONS

Sondag; "Predictive Thread-to-Core Assignment on a Heterogeneous Multi-Core Processor"—Oct. 18, 2007—pp. 1-5—http://citeseerx.ist.psu.edu/viewdoc/download?doi=10.1.1.90.9734&rep=rep1&type=pdf.

(Continued)

*Primary Examiner* — Sanjiv Shah
*Assistant Examiner* — Marwan Ayash
(74) *Attorney, Agent, or Firm* — Kevin Sullivan; Raghu Chinagudabha; Micky Minhas

(57) ABSTRACT

Private or shared read-only memory regions. One embodiment may be practiced in a computing environment including a plurality of agents. A method includes acts for declaring one or more memory regions private to a particular agent or shared read only amongst agents by having software utilize processor level instructions to specify to hardware the private or shared read only memory address regions. The method includes an agent executing a processor level instruction to specify one or more memory regions as private to the agent or shared read-only amongst a plurality of agents. As a result of an agent executing a processor level instruction to specify one or more memory regions as private to the agent or shared read-only amongst a plurality of agents, a hardware component monitoring the one or more memory regions for conflicting accesses or prevents conflicting accesses on the one or more memory regions.

20 Claims, 5 Drawing Sheets

(56) References Cited

U.S. PATENT DOCUMENTS

| | | | |
|---|---|---|---|
| 6,976,155 B2 | 12/2005 | Drysdale | |
| 7,111,294 B2 | 9/2006 | Steensgaard | |
| 7,127,561 B2 | 10/2006 | Hill | |
| 7,162,512 B1 | 1/2007 | Amit | |
| 7,181,578 B1 | 2/2007 | Guha | |
| 7,210,145 B2 | 4/2007 | Srinivasan | |
| 7,213,106 B1 | 5/2007 | Koster | |
| 7,246,123 B2 | 7/2007 | Carr | |
| 7,284,091 B2 | 10/2007 | Chow et al. | |
| 7,320,065 B2 | 1/2008 | Gosior | |
| 7,343,476 B2 | 3/2008 | Floyd et al. | |
| 7,376,800 B1 | 5/2008 | Choquette | |
| 7,395,382 B1 | 7/2008 | Moir | |
| 7,406,698 B2 | 7/2008 | Richardson | |
| 7,421,544 B1 | 9/2008 | Wright et al. | |
| 7,467,323 B2 | 12/2008 | Fields | |
| 7,478,210 B2 | 1/2009 | Saha | |
| 7,502,897 B2 | 3/2009 | Hertzberg | |
| 7,512,636 B2 | 3/2009 | Verma | |
| 7,516,366 B2 | 4/2009 | Lev | |
| 7,548,919 B2 | 6/2009 | Gupta et al. | |
| 7,584,232 B2 | 9/2009 | Guo | |
| 7,711,909 B1* | 5/2010 | Lev et al. | 711/156 |
| 7,856,537 B2 | 12/2010 | Kumar | |
| 7,860,847 B2 | 12/2010 | Detlefs et al. | |
| 8,095,824 B2 | 1/2012 | Gray | |
| 8,229,907 B2 | 7/2012 | Gray | |
| 2003/0055807 A1 | 3/2003 | Lomet | |
| 2003/0145136 A1 | 7/2003 | Tierney et al. | |
| 2003/0188300 A1 | 10/2003 | Patrudu | |
| 2004/0162951 A1 | 8/2004 | Jacobson et al. | |
| 2004/0243868 A1 | 12/2004 | Toll | |
| 2005/0060495 A1 | 3/2005 | Pistoulet | |
| 2005/0246487 A1 | 11/2005 | Ergan | |
| 2006/0085591 A1 | 4/2006 | Kumar | |
| 2007/0143287 A1 | 6/2007 | Adl-Tabatabai | |
| 2007/0143741 A1 | 6/2007 | Harris | |
| 2007/0156780 A1 | 7/2007 | Saha | |
| 2007/0156971 A1 | 7/2007 | Sistla et al. | |
| 2007/0156994 A1 | 7/2007 | Akkary | |
| 2007/0186056 A1 | 8/2007 | Saha et al. | |
| 2007/0198792 A1 | 8/2007 | Dice | |
| 2007/0198979 A1 | 8/2007 | Dice | |
| 2007/0239943 A1 | 10/2007 | Dice | |
| 2007/0245099 A1 | 10/2007 | Gray | |
| 2007/0245128 A1 | 10/2007 | Gray | |
| 2007/0260608 A1 | 11/2007 | Hertzberg | |
| 2007/0260942 A1 | 11/2007 | Rajwar | |
| 2008/0021934 A1 | 1/2008 | Hudson | |
| 2008/0040551 A1 | 2/2008 | Gray | |
| 2008/0098374 A1 | 4/2008 | Adl-tabatabai et al. | |
| 2008/0127035 A1 | 5/2008 | Lev | |
| 2008/0162886 A1 | 7/2008 | Saha | |
| 2008/0163220 A1 | 7/2008 | Wang | |
| 2008/0256074 A1 | 10/2008 | Lev et al. | |
| 2008/0270745 A1 | 10/2008 | Saha | |
| 2009/0006407 A1 | 1/2009 | Magruder | |
| 2009/0006467 A1 | 1/2009 | Visscher | |
| 2009/0006751 A1 | 1/2009 | Taillefer | |
| 2009/0006767 A1 | 1/2009 | Saha | |
| 2009/0007119 A1 | 1/2009 | Blumrich | |
| 2009/0019231 A1 | 1/2009 | Cypher | |
| 2009/0063780 A1 | 3/2009 | Terechko | |
| 2009/0070774 A1 | 3/2009 | Raikin et al. | |
| 2009/0089520 A1 | 4/2009 | Saha | |
| 2009/0113443 A1 | 4/2009 | Heller | |
| 2009/0172292 A1 | 7/2009 | Saha | |
| 2009/0172303 A1 | 7/2009 | Welc | |
| 2009/0172305 A1 | 7/2009 | Shpeisman | |
| 2009/0172306 A1 | 7/2009 | Nussbaum | |
| 2009/0172654 A1 | 7/2009 | Zhao | |
| 2009/0182956 A1 | 7/2009 | Caprioli et al. | |
| 2009/0204969 A1 | 8/2009 | Abadi | |
| 2009/0235237 A1 | 9/2009 | Song et al. | |
| 2009/0235262 A1* | 9/2009 | Ceze et al. | 718/102 |
| 2009/0260011 A1 | 10/2009 | Snover | |
| 2009/0282386 A1 | 11/2009 | Moir et al. | |
| 2009/0327538 A1 | 12/2009 | Iwatsuki | |
| 2010/0131953 A1 | 5/2010 | Dice | |
| 2010/0138841 A1 | 6/2010 | Dice et al. | |
| 2010/0162249 A1 | 6/2010 | Shpeisman | |
| 2010/0169382 A1 | 7/2010 | Sheaffer | |
| 2010/0169579 A1 | 7/2010 | Sheaffer | |
| 2010/0169580 A1 | 7/2010 | Sheaffer | |
| 2010/0229043 A1 | 9/2010 | Saha | |
| 2010/0325630 A1 | 12/2010 | Flood | |
| 2011/0145304 A1 | 6/2011 | Gray | |
| 2011/0145498 A1 | 6/2011 | Taillefer | |
| 2011/0145553 A1 | 6/2011 | Levanoni | |
| 2011/0145802 A1 | 6/2011 | Levanoni | |
| 2012/0179877 A1 | 7/2012 | Shriraman et al. | |
| 2012/0284485 A1 | 11/2012 | Yamada | |

OTHER PUBLICATIONS

Zhao; "CacheScouts: Fine-Grain Monitoring of Shared Caches in CMP Platforms"—2007—pp. 1-11—http://www.cs.ucr.edu/~zhao/paper/Pact_CacheScout_2007.pdf.

Lilja; "Cache Coherence in Large-Scale Shared Memory Multiprocessors: Issues and Comparisons"—Sep. 1993—pp. 1-43—http://www.arctic.umn.edu/papers/coherence-survey.pdf.

Censier; "A New Solution to Coherence Problems in Multicache Systems"—Dec. 1978—pp. 1-7—http://citeseerx.ist.psu.edu/viewdoc/download?doi=10.1.1.111.7854&rep=rep1&type=pdf.

Papamarcos; "A Low-Overhead Coherence Solution for Multiprocessors with Private Cache Memories"—1984—pp. 348-354—http://www.csl.cornell.edu/courses/ece572/papamarcos.isca84.pdf.

Office Action dated Dec. 12, 2011 cited in U.S. Appl. No. 12/493,165.

Notice of Allowance dated Nov. 28, 2011 cited in U.S. Appl. No. 12/493,163.

Office Action dated Oct. 4, 2011 cited in U.S. Appl. No. 12/495,582.

Ananian; "Unbounded Transactional Memory"; 2009; pp. 1-12; http://supertech.csail.mit.edu/papers/xaction.ps.

Shriraman; "Hardware Acceleration of Software Transactional Memory"; Dec. 2005; pp. 1-22; https://urresearch.rochester.edu/retrieve/5518/05.tr887.Hardware_acceleration_of_software_transactional_memory.pdf.

Chaung; "Maintaining Safe Memory for Security, Debugging, and Multi-threading"; 2006; pp. 1-186; http://www.cse.ucsd.edu/Dienst/Repository/2.0/Body/ncstrl.ucsd_cse/CS2006-0873/postscript.

U.S. Appl. No. 12/495,582, filed Jun. 30, 2009, Gray.

Yen; "LogTM-Se: Decoupling Hardware Transactional Memory from Caches"; Feb. 10-14, 2007; pp. 1-12; http://www.cs.wisc.edu/multifacet/papers/hpca07_logtmse.pdf.

Author Unknown; "CP3SP33 Connectivity Processor with Cache, DSP, and Bluetooth, USB, and Dual CAN Interfaces"; Jul. 2007; pp. 1-346; http://www.national.com/appinfo/cp3000/files/CP3SP33.pdf.

Abadi; "Transactional Memory with Strong Atomicity Using Off-the-Shelf Memory Protection Hardware"; 2009; pp. 1-11; http://research.microsoft.com/en-us/um/people/tharris/papers/2009-ppopp.pdf.

Moravan; "Supporting Nested Transactional Memory in LogTM"; Oct. 21-25, 2006; pp. 1-12; http://wwww.cs.wisc.edu/multifacet/papers/asplos06_nested_logtm.pdf.

Author Unknown; "Extending Hardware Transactional Memory to Support Non-Busy Waiting and Non-Transactional Actions"; 2006; pp. 1-19; http://209.85.229.132/search?q=cache:-9KSLEk_CcIJ:www.cs.purdue.edu/homes/jv/events/TRANSACT/slides/zilles.pdf+non-transactional+instructions+and+abort&cd=3&hl=en&ct=clnk&gl=in.

Carlstrom; "The ATOMOΣ Transactional Programming Language"; Jun. 11-16, 2006; pp. 1-13; http://tcc.stanford.edu/publications/tcc_pldi2006.pdf.

Moss; "Open Nested Transactions"; Semantics and Support; 2006; pp. 1-8; http://www.cs.utah.edu/wmpi/2006/final-version/wmpi-posters-1-Moss.pdf.

(56) References Cited

OTHER PUBLICATIONS

Minh; "An Effective Hybrid Transactional Memory System with Strong Isolation Guarantees"; Jun. 9-13, 2007; pp. 1-12; http://tcc.stanford.edu/publications/tcc_isca2007.pdf.
Chong; "Scalable HMM based Inference Engine in LVCSR"; Mar. 31, 2009; 1 page; http://www.icsi.berkeley.edu/cgi-bin/events/event.pl?ID=000531.
Zeichick; "Massive Multi-Core Processors: The Gamer's Edge"; Oct. 4, 2007; pp. 1-2; http://developer.amd.com/documentation/articles/Pages/1042007177.aspx.
Vasanatharam; "CSMP"; 2009; pp. 1-3; http://sourceforge.net/projects/mupisoft/.
Bracy; "Disintermediated Active Communication"—Nov. 9, 2006—pp. 1-4—http://ieeexplore.ieee.org/stamp/stamp.jsp?arnumber=04069172.
Shriraman; "Hardware Acceleration of Software Transactional Memory"—Dec. 2005—pp. 1-22—https://urresearch.rochester.edu/retrieve/5518/05.tr887.Hardware_acceleration_of_software_transactional_memory.pdf.
Chuang; "Unbounded Page-Based Transactional Memory"—Oct. 21-25, 2006—pp. 1-12—http://www.cse.ucsd.edu/~wchuang/ASPLOS-06-PTM.pdf.
Swift; "OS Support for Virtualizing Hardware Transactional Memory"—2008—pp. 1-10 http://www.cs.wisc.edu/multifacet/papers/transact08_tvm.pdf.
Singh; "A Metadata Catalog Service for Data Intensive Applications"—Nov. 15-21, 2003—pp. 1-17—http://www.irit.fr/~Jean-Marc.Pierson/DEAGrids/2003-2004/DataandMetaDataManagement/mcs_sc2003.pdf.
Andrew; "A Dictionary of HTML META Tags"—Feb. 11, 2007—pp. 1-11—http://vancouver-webpages.com/META/metatags.detail.html.
Spear; "Implementing and Exploiting Inevitability in Software Transactional Memory"—2008—pp. 59-66—http://ieeexplore.ieee.org/stamp/stamp.j sp?arnumber=04625833.
Author Unknown; Wikipedia; "Software Transactional Memory"—May 7, 2009—pp. 1-7—http://en.wikipedia.org/wiki/Software_transactional_memory.
Office Action dated Apr. 4, 2012 cited in U.S. Appl. No. 12/638,929.
Curnow—"An Embedded Processor Architecture with Extensive Support for SoC Debug"—Retrieved Jun. 11, 2010; pp. 1-5.
Joao; "Flexible Reference-Counting-Based Hardware Acceleration for Garbage Collection"—Published Jun. 20-24, 2009 pp. 1-11.
Grossman; "The Transactional Memory/Garbage Collection Analogy"—Published Oct. 21-25, 2007—pp. 1-12.
Adl-Tabatabai; "Unlocking Concurrency"—Published Dec./Jan. 2006-2007 pp. 25-33.
Carlstrom; "Executing Java Programs with Transactional Memory"—Published Mar. 26, 2007 pp. 1-32.
Diestelhorst—"Hardware Acceleration for lock-free data structures and software-transactional memory"—Published Aug. 14, 2008 pp. 1-8.
Harizopoulos—"Steps towards cache-resident transaction processing"—Published 2004 pp. 1-12.
Lie—"Hardware Support for Unbounded Transactional Memory"—Published May 7, 2004 pp. 1-111.
Saha—"Architectural Support for Software Transactional Memory"—Published 2006 pp. 1-12.
Volos—"NePalTM: Design and Implementation of Nested Parallelism for Transactional Memory"—Published 2009, pp. 1-25.
Rothermel—"Concurrency Control Issues in Nested Transactions"—Published 1992, pp. 1-36.
Author Unknown—".NET Framework 4 Beta 1 enabled to use Software Transactional Memory (STM.Net Version 1.0)"—Published Jul. 24, 2009; pp. 1-84.
Nyte—"Nesting Models in Software Transactional Memory"—Published Sep. 14, 2007; pp. 1-3.
Agrawal—"Nested parallelism in transactional memory"—Published 2008; pp. 163-174.
Bobba—"Performance Pathologies in Hardware Transactional Memory"—Published 2007; pp. 1-11.
Author Unknown—"Hw-breakpoint: shared debugging registers"—Published Sep. 16, 2009; pp. 1-3.
Scherer—"Contention Management in Dynamic Software Transactional Memory"—Published Apr. 2004; pp. 1-10.
Zilles et al. "Extending Hardware Transactional Memory to Support Non-busy Waiting and Non-transactional Actions," Nov. 2006, pp. 1-10.
Office Action dated Jan. 20, 2012 cited in U.S. Appl. No. 12/493,167.
Notice of Allowance dated Feb. 21, 2012 cited in U.S. Appl. No. 12/493,161.
Office Action dated Mar. 29, 2012 cited in U.S. Appl. No. 12/493,168.
Office Action dated Mar. 16, 2012 cited in U.S. Appl. No. 12/493,162.
Notice of Allowance dated Mar. 14, 2012 cited in U.S. Appl. No. 12/495,582.
Notice of Allowance dated Apr. 9, 2012 cited in U.S. Appl. No. 12/493,161.
Notice of Allowance dated Jun. 24, 2013 cited in U.S. Appl. No. 12/638,103.
Notice of Allowance dated Nov. 12, 2013 cited in U.S. Appl. No. 13/554,558.
Office Action dated Nov. 13, 2013 cited in U.S. Appl. No. 12/638,345.
Notice of Allowance dated Nov. 29, 2012 cited in U.S. Appl. No. 12/638,929.
Harris et al., "Abstract Nested Transactions", Aug. 2007 CiteSeerX, http://citeseer.ist.psu.edu/viewdoc/summary? doi=10.1.1.126.3885, pp. 1-10.
Office Action dated Dec. 7, 2012 cited in U.S. Appl. No. 12/638,103.
Office Action dated Jan. 4, 2013 cited in U.S. Appl. No. 12/638,214.
U.S. Appl. No. 13/845,467, filed Mar. 18, 2013, Gray.
U.S. Appl. No. 13/554,558, May 1, 2013, Office Action.
Notice of Allowance dated Mar. 20, 2013 cited in U.S. Appl. No. 12/493,167.
Office Action dated Aug. 20, 2012 cited in U.S. Appl. No. 12/638,929.
Notice of Allowance dated Sep. 13, 2012 cited in U.S. Appl. No. 12/493,168.
Notice of Allowance dated Sep. 24, 2012 cited in U.S. Appl. No. 12/493,165.
Office Action dated Oct. 24, 2012 cited in U.S. Appl. No. 12/493,162.
Office Action dated Oct. 5, 2012 cited in U.S. Appl. No. 12/493,167.
Office Action dated Jul. 17, 2013 cited in U.S. Appl. No. 12/638,345.
Notice of Allowance dated May 31, 2013 cited in U.S. Appl. No. 12/638,214.
Office Action dated Jun. 11, 2014 cited in U.S. Appl. No. 12/638,345.

* cited by examiner

PRIVATE MEMORY REGIONS AND COHERENCE OPTIMIZATIONS

CROSS-REFERENCE TO RELATED APPLICATIONS

This application is related to U.S. patent application Ser. No. 12/493,167 filed Jun. 26, 2009, and entitled "PERFORMING ESCAPE ACTIONS IN TRANSACTIONS", as well as U.S. application Ser. No. 12/493,163, filed Jun. 26, 2009, and entitled "WAIT LOSS SYNCHRONIZATION", as well as U.S. application Ser. No. 12/493,162, filed Jun. 26, 2009, and entitled "FLEXIBLE READ-AND WRITE-MONITORED AND BUFFERED MEMORY BLOCKS", as well as U.S. application Ser. No. 12/493,168, filed Jun. 26, 2009, and entitled "MINIMIZING CODE DUPLICATION IN AN UNBOUNDED TRANSACTIONAL MEMORY", as well as U.S. application Ser. No. 12/493,161, filed Jun. 26, 2009, and entitled "OPERATING SYSTEM VIRTUAL MEMORY MANAGEMENT FOR HARDWARE TRANSACTIONAL MEMORY", as well as U.S. application Ser. No. 12/493,165, filed Jun. 26, 2009, and entitled "METAPHYSICALLY ADDRESSED CACHE METADATA". All of the foregoing applications are being filed concurrently herewith and are incorporated herein by reference.

BACKGROUND

Background and Relevant Art

Computers and computing systems have affected nearly every aspect of modern living. Computers are generally involved in work, recreation, healthcare, transportation, entertainment, household management, etc.

To increase the processing power of modern computing systems, such systems often implement multi processing. For example, multiple threads or multiple processor cores can be implemented within a computing system. The multiple agents will often share the same system virtual memory, but may each have their own cache memory, or may share cache memory with some subset of the agents in the system. Thus, a memory hierarchy typically includes a number of different cache memories that can store information retrieved from a physical memory (such as DRAM), where the physical memory has data stored in it mapped from the virtual memory. Virtual memory size can exceed physical memory size by storing data on a hard drive or other mass storage and moving that data to the physical memory when needed. A memory mapping unit on a processor core keeps track of mapping between virtual and physical memory to ensure that appropriate data is accessed as appropriate.

Typically, the cache memory and the agents are formed on the same semiconductor die, or at least in the same chip package. Additionally cache is much smaller and uses a type of memory that is much faster than virtual memory or physical memory implemented on a system. As a result, communications between an agent and the cache are very fast as compared to communication between an agent and external physical or virtual memory. However, cache is typically much smaller in capacity when compared to physical and/or virtual memory. Thus, to increase system performance, recently used or often used data is stored in the cache and data is only fetched from virtual or physical memory when needed and not found in the cache.

Current page-level virtual memory protection does not offer a mechanism to declare certain memory regions as thread private (completely out of bounds to other threads) or shared-read-only, at a granularity finer than page-level protection for an application or its runtime. Further, no hardware assistance currently exists to rule out any unintentional accesses to private or read-only shared data, or at any rate, to diagnose such accesses should they arise. This is because the current virtual memory protection schemes are not usually thread-private nor are they fine grained.

As noted above, a system may have number of caches and only a single shared memory. Each of the caches may have copies of data from the shared memory. If an agent performs an operation on its copy of data, such as an operation that changes the data in the copy, it is important that other agents in the system are aware of the changes if they have their own different copy of the same data. To accomplish this, cache coherence protocols, such as the Illinois MESI protocol, can be used to ensure that operations on different copies of data do not conflict. MESI stands for the modified (or dirty), exclusive, shared and invalid states respectively. Because in a cache hierarchy there may be several different copies of a particular piece of data, an indicator is used to indicate the state and sharing of data at a particular location. If the indicator indicates that the data is modified, that means that the data at that location was modified by an agent at that location. If the indicator indicates that data is exclusive, this means that no other agents at have a cached copy of the data. If the indicator indicates that the data is shared, this means that other agents may share the same version of the data. If the data is indicated as invalid, then the data at the current location is invalid and will not be used.

These cache coherence protocols send messages or other signals between agents and cores to correlate data operations. In many-core chip-multiprocessors, the massive amount of cache coherence traffic that may be exchanged amongst the many cores may form a barrier to scaling. Further, the high bandwidth interconnect fabric necessary to carry the traffic, and the cache ports needed to snoop the traffic, may significantly impact the die area or power budget of the design. Yet some of the coherence traffic arises from accesses to thread-private data that by definition is not accessed by other agents and that other agents' caches never need to snoop.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment may be practiced in a computing environment including a plurality of agents. A method includes acts for declaring one or more memory regions private to a particular agent or shared read only amongst agents by having software utilize processor level instructions to specify to hardware the private or shared read only memory address regions. The method includes an agent executing a processor level instruction to specify one or more memory regions as private to the agent or shared read-only amongst a plurality of agents. As a result of an agent executing a processor level instruction to specify one or more memory regions as private to the agent or shared read-only amongst a plurality of agents, a hardware component monitoring the one or more memory regions for conflicting accesses or prevents conflicting accesses on the one or more memory regions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments perform inter-agent memory access conflict detection using memory read and write monitoring using a cache, using microprocessors with an instruction set architecture which facilitates setting read and write monitors on cache lines, monitoring for conflicting accesses on monitored data, and testing for read and write monitors on cache lines.

Figure 1A:
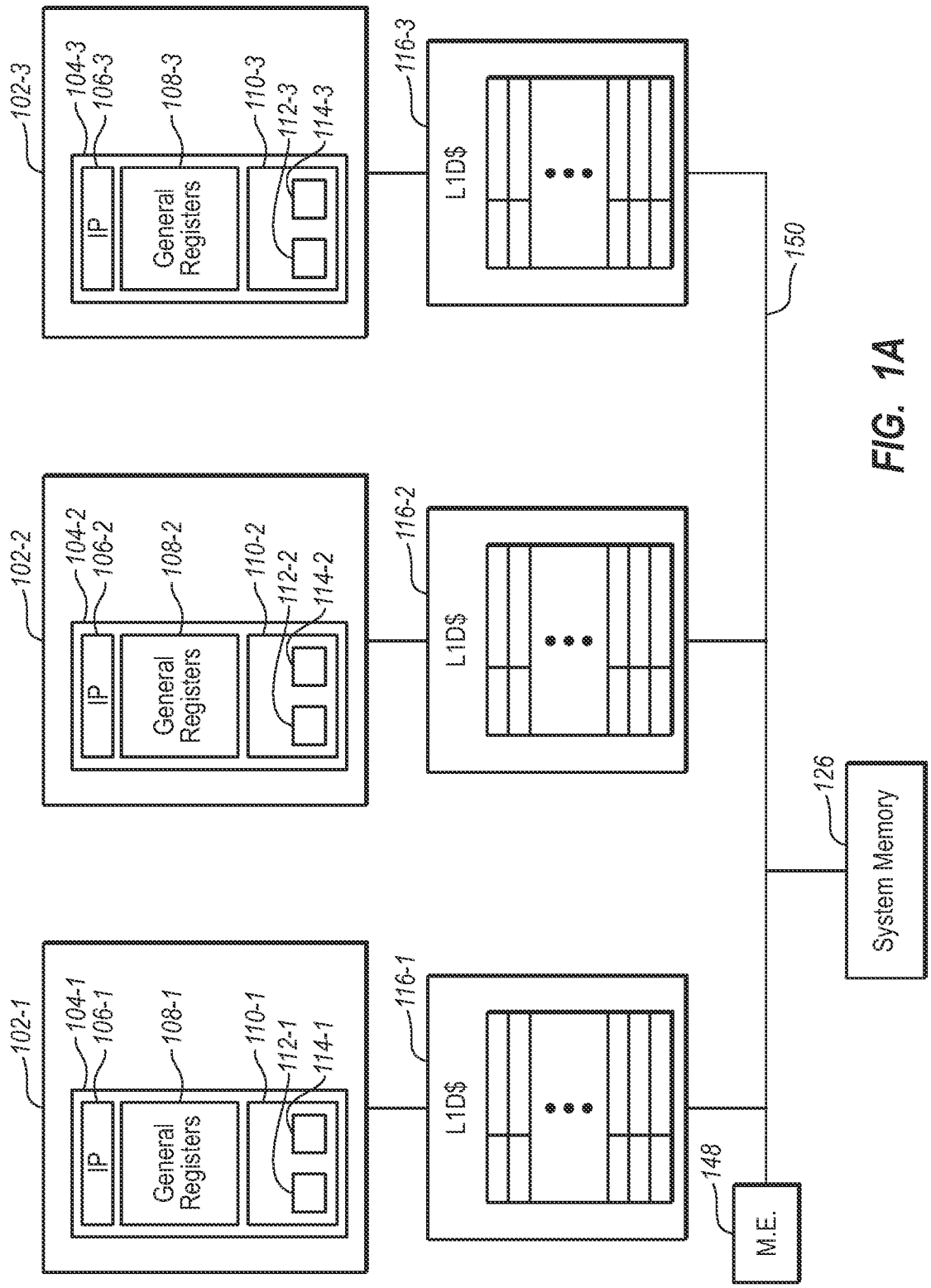
FIG. 1A illustrates a cache hierarchy.
Figure 1B:
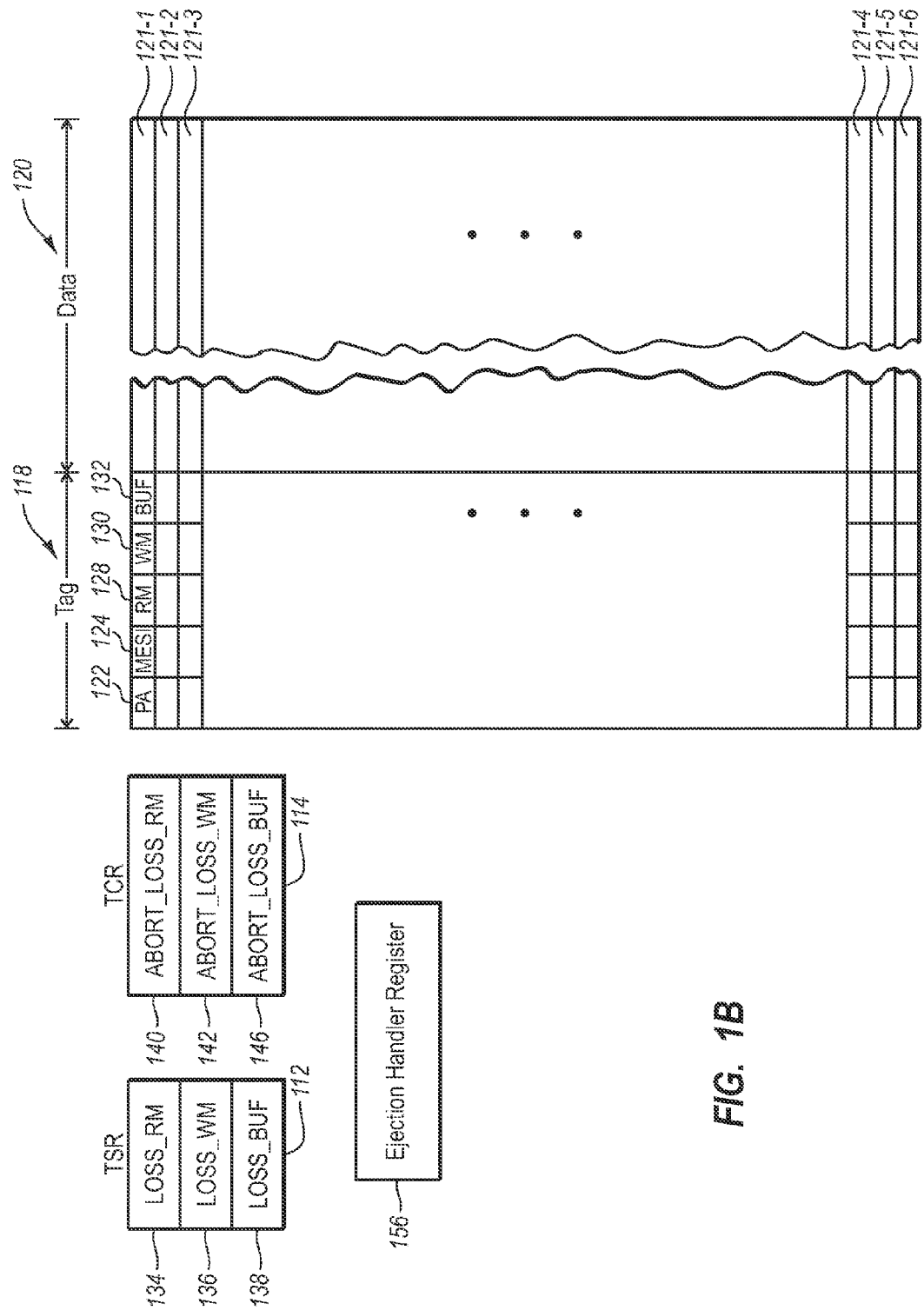
FIG. 1B illustrates details of a data cache with monitoring enabled.

Some embodiments perform inter-agent memory access conflict detection, without using a cache, via an external monitoring engine agent on the cache coherence fabric that represents read and write monitors on memory regions that are not necessarily constrained to be the size of cache lines or constrained to the size of a cache, snoops memory access traffic and monitoring for conflicting accesses on monitored memory regions. Referring now to FIGS. 1A and 1B, an example of data caches that may be used is illustrated.

Referring now to FIG. 1A, an example environment is illustrated. FIG. 1A illustrates a plurality of processors 102-1-102-3. When referred to generically herein, the processors may be referred to simply as processor 102. In fact any component referred to using a specific appendix designator may be referred to generically without the appendix designator, but with a general designator to which all specific examples belong. Each of the processors implements one or more threads (referred to generically as 104). In the present example, each of the processors 102-1-102-3 supports a single thread 104-1-104-3 respectively. Each of the threads 104-1-104-3 includes an instruction pointer 106-1-106-3, general registers 108-1-108-3, and special registers 110-1-110-3. Each of the special registers 110-1-110-3 includes a transaction control register (TCR) 112-1-112-3 and a transaction status register (TSR) 114-1-114-3. The functionality of these registers will be explained in more detail below in conjunction with the description of FIG. 1B.

Reference once again to FIG. 1A further illustrates that connected to each processor is a level 1 data cache (L1D$) 116-1, 116-2 and 116-3. Details of a L1D$ are now illustrated with reference to FIG. 1B. FIG. 1B illustrates that a L1D$ 116 includes a tag column 118 and a data column 120 for each cache line 121. The tag column 118 typically includes an address column 122 and a MESI column 124. The address column 122 includes a physical address for data stored in the data column 120. In particular, as illustrated in FIG. 1A, a computing system generally includes system memory 126. The system memory may be, for example semiconductor based memory, one or more hard-drives and/or flash drives. The system memory 126 has physical addresses where data is stored. In particular, a physical address identifies some memory location in physical memory, such as system DRAM, whereas a virtual address identifies an absolute address for data. Data may be stored on a hard disk at a virtual address, but will be assigned a physical address when moved into system DRAM.

In the present example, the tag column 118 includes three additional columns, namely a read monitor column (RM) 128, a write monitor column (WM) 130 and a buffer indicator column (BUF) 132. Entries in these columns are typically binary indicators. In particular, a RM entry in the RM column 128 is set on a cache line 121 basis for a particular thread, and indicates whether or not a block of data in the data column 120 should be monitored to determine if the data in the data column 120 is written to by another thread. A WM entry in the WM column 120 is set on a cache line 121 basis for a particular thread, and indicates whether or not the block of data in the data column 120 should be monitored to determine if the data in the data column is read by or written to by another thread. A BUF entry in the BUF column is set on a cache line 121 basis for a particular thread 132, and indicates whether or not data in an entry of the data column 120 is buffered data or if the data is cached data. In particular, the BUF entry can indicate whether a block of data is taken out of cache coherence to provide a thread private buffer for speculative writes during a transaction.

Notably, while the RM column 128, the WM column 130, and BUF column 132 are treated as separate columns, it should be appreciated that these indicators could be in fact combined into a single indicator. For example, rather than using one bit for each of the columns, two bits could be used to represent certain combinations of these indicators collectively. In another example, RM column 128, the WM column 130, and BUF column 132 may be represented together with the MESI indicators in the MESI column 124. These seven binary indicators (i.e. M, E, S, I, RM, WM, and BUF) could be represented with fewer bits of state.

Notably, the indicators in the RM column 128, the WM column 130, and BUF column 132 may be accessible to a programmer using various programming instructions made accessible in a processor's instruction set architecture as will be demonstrated in further detail below. In particular, using processor level instructions included as part of the instruction set architecture of the processor, a programmer can set, reset, and test values for the RM column 128, the WM column 130, and BUF column 132.

FIG. 1B further illustrates details of the transaction status register 112 included in the hardware threads 104. The transaction status register 112 accumulates events related to the read monitor indicator, the write monitor indicator, and the buffering indicator. In particular, the transaction status register 112 includes an entry 134 to accumulate a loss of read monitor, an entry 136 to accumulate a loss of write monitor, and an entry 138 to accumulate a loss of buffering.

Illustrating now an example, a software designer may code instructions that when executed by the thread 104-1 cause a read monitor indicator to be set for a memory block. If another thread writes to an address in the monitored memory block, such a conflicting access causes the read monitor indicator to be reset, and accumulates in the loss of read monitor entry 134. A similar case applies when a write monitor indicator is set, and another thread reads or writes to an address in the monitored memory block, causing the write monitor to be reset, and accumulates in the loss of write monitor entry 136.

FIG. 1B illustrates further details of the transaction control register 114. The transaction control register 114 includes entries defining actions that should occur on the loss of read monitor, write-monitor, and/or buffering. In particular, the transaction control register 114 includes an entry 140 that indicates whether or not a transaction should be aborted on the loss of the read monitor, an entry 142 that indicates whether or not a transaction should be aborted on the loss of the write monitor, and an entry 146 that indicates if the transaction should be aborted on the loss of the buffering. Abort is implemented by a hardware control transfer (jump) to a software abort handler.

For example, and continuing with the example above where a software designer has coded instructions that when executed by the thread 104-1 cause a read monitor indicator to be set for a memory block, if another thread writes to an address in the memory block, in addition to noting such access in the read monitor entry 134, the read monitor indicator in the read monitor column 128 may be reset.

Further, in some embodiments, a separate monitoring engine 148 as illustrated in FIG. 1A on the system coherence fabric could be used to monitor for the loss of the read monitor. For example, the monitoring engine 148 can monitor traffic on the cluster coherence bus 150. The monitoring engine 148, as described below, can also or alternatively block or modify coherence request messages.

A data cache may be used to cache thread private data. For example, a cache 116 may store data that will only be used by a thread 104. This data does not need to be accounted for in cache coherence protocols, because the data will not be accessed by other threads, and the data will not conflict with copies of data at other thread's caches. Some embodiments may be implemented where cache coherence traffic is blocked or cache snooping operations are disabled when thread private data is stored in a cache 116.

Figure 1C:
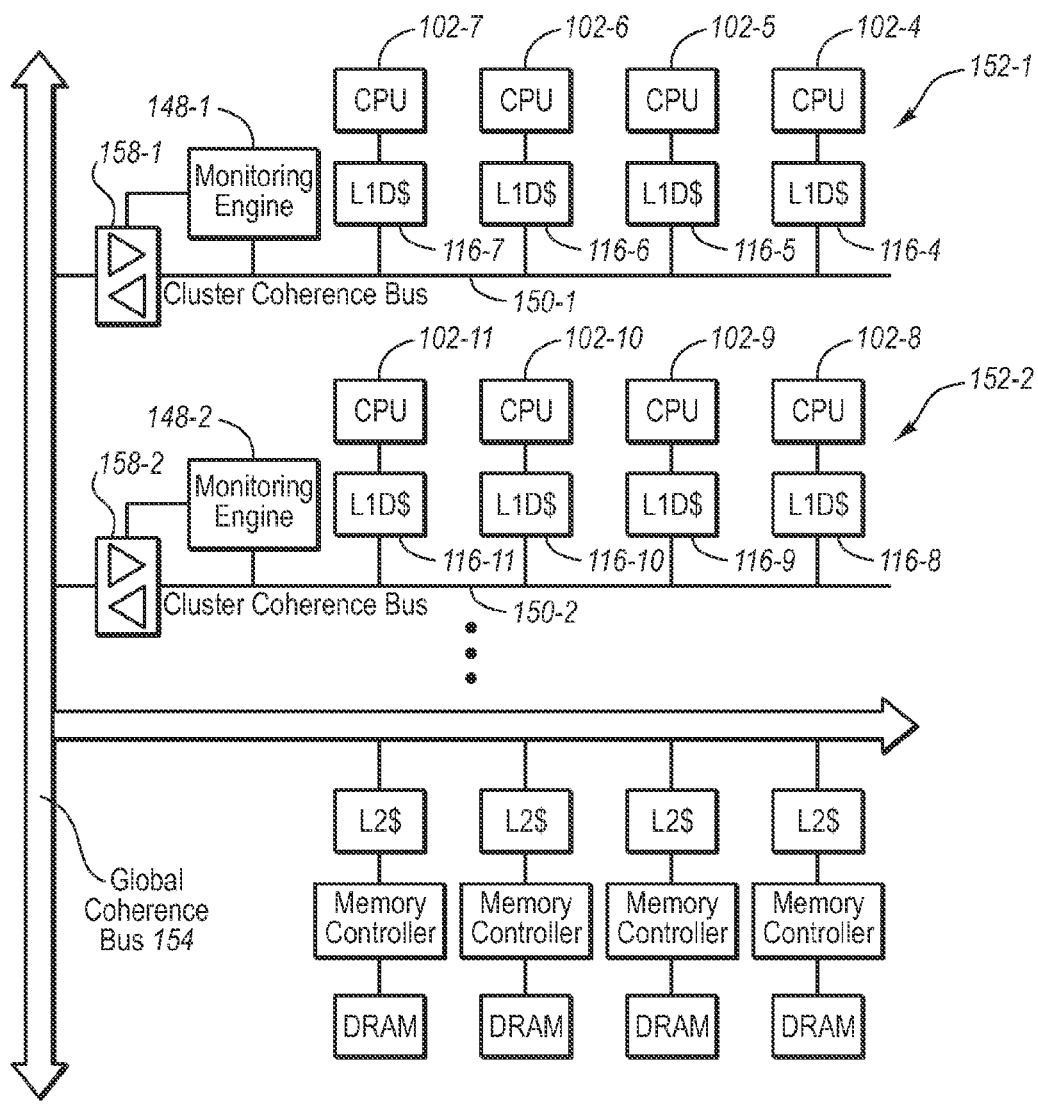
FIG. 1C illustrates a multiprocessor with a hierarchical cache/memory system interconnect partitioned into clusters of processors.

FIG. 1C illustrates an example of one embodiment where such functionality may be used. Referring now to FIG. 1C, a computing system is illustrated. The computing system includes a number of clusters of processors 152. Each of the clusters 152 includes a number of processor and cache combinations. For example, the cluster 152-1 includes a processor 102-4 coupled to a L1D$ 116-4. The cluster 152-1 further includes a processor 102-5 coupled to a L1D$ 116-5. The first cluster 152-1 includes a processor 102-6 coupled to a L1D$ 116-6. The first cluster 152-1 includes a processor 102-7 couple to a L1D$ 116-7. Similarly, the second coherence cluster 152-2 includes a processor 102-8 coupled to a L1D$ 116-8. The second coherence cluster 152-2 further includes a processor 102-9 coupled to a L1D$ 116-9. The second coherence cluster 152-2 further includes a processor 102-10 coupled to a L1D$ 116-10. The second coherence cluster 152-2 further includes a processor 102-11 coupled to a L1D$ 116-11. Each of the coherence clusters further includes a monitoring engine 148-1 and 148-2 respectively. While not shown here, the system may include additional clusters of processors. Each of the coherence clusters 152 are coupled together through a global coherence bus 154. While the example shown here illustrates that a monitoring engine 148 is included for a cluster of processors, in another embodiment, a monitoring engine may be implemented on a per thread or per processor basis. An example is illustrated below in FIG. 1D.

Figure 1D:
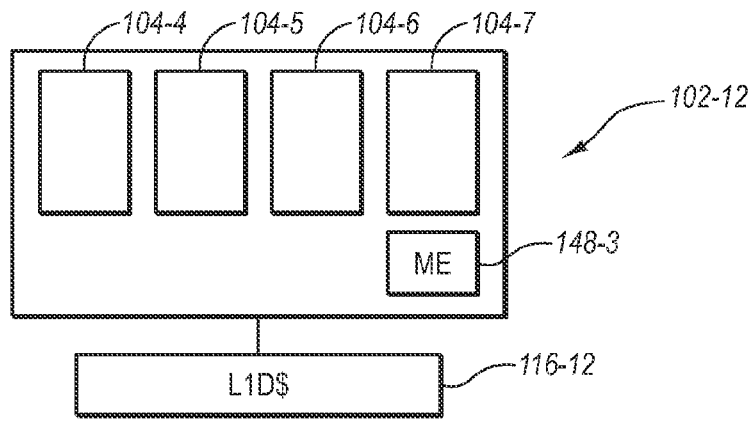
FIG. 1D illustrates an example where multiple threads are implemented in a processor core.

FIG. 1D illustrates a processor 102-12 which includes four hardware threads 104-4, 104-5, 104-6 and 104-7. The processor 102-12 also has, or is coupled to, a monitoring engine 148-3 implemented in the processor 102-12, which may be implemented on the same die or at least in the same chip package as the processor 102-12. The processor 102-12 is coupled to a L1D$ 116-12. The monitoring engine 148-3 can manage coherence traffic for the threads 104-4 through 104-7 with respect to other processors 102 and data caches 116.

In one embodiment, each monitoring engine 148 keeps tables for each hardware thread of the cores the monitoring engine 148 corresponds to, that maintains the set of read monitored (RM) and write monitored (WM) monitoring list of regions for that thread. In particular this set may be a bit vector, run-length encoded, or hierarchical bit vector (or some other representation).

In one embodiment, each monitoring engine 148 can efficiently represent monitoring on a continuous 1 MB memory region (such as a thread's call stack). Additionally, as noted previously embodiments include processors with an extended instruction set architecture implementing processor level instructions that allow for set RM and WM instructions that take an address range, such as a base address and an extent (size), and establish such monitoring at the monitoring engine 148.

Using this infrastructure software is now able to declare regions of private or read-only memory to hardware. The hardware may then be responsible for monitoring for conflicting accesses or for prevent conflicting accesses. In one embodiment, to declare a private region of memory, software issues set WM instructions including the region-base and region-extent of the private memory. A subsequent loss of write monitoring on this memory indicates that another thread read or wrote that region, or in some embodiments, that the monitoring engine 148 hit a capacity limit.

In one embodiment, to declare a shared-read-only region of memory, software issues a set RM instruction including a region-base and a region-extent of the memory. A subsequent loss of read monitoring indicates another agent wrote that an address region, or in some embodiments, that the monitoring engine 148 hit a capacity limit.

Software may configure the hardware thread to eject to a handler upon loss of monitoring and thereby issue a diagnostic when another agent such as a thread violates the private or shared-read-only access convention. In another variant the monitoring engine 148 could deny the second thread's attempt to access thread private memory. In particular, the monitoring engine 148 may use a protocol, such as an extension of the MESI protocol, which includes messages that can deny access requests, for example by communicating a negative acknowledgement. For example, a cache 102 or monitoring engine 148 may send a message denying another thread's request to read a line or read a line for exclusive ownership.

In multiprogramming environments, where an agent, such as a hardware thread, is shared amongst a number of different tasks, on a context switch the operating system may still flush the thread's memory access monitoring, and upon rescheduling of the thread, arrange to deliver a loss of monitoring event to the thread, or reset the thread's program counter to execute a monitor reload sequence. An agent is a component of a computer system that interacts with shared memory. For example it may be a CPU core or processor, a thread in a multi-threaded CPU core, a DMA engine, a memory mapped peripheral, etc.

In some embodiments, the monitoring engine 148 can act as a coherence filter. If a read or write is issued by a core 102 on behalf of a thread 104, if that thread 104 holds a WM on the memory that contains the data, and if the read or write misses the cache 116 of the core 102, a cache line read request message is issued. Ordinarily this will have to snoop all of the peer caches in case they hold a modified line for that cache line. The peer cache snooping may be unnecessary because the data is not in any other peer cache 116. Particularly in a segmented or hierarchical coherence fabric the monitoring engine 148 can kill or re-label the coherence message, so it is not repeated to, nor snooped by cores in other subnets of the coherence fabric However, in some embodiments, on cache miss accesses to memory designated as private memory for a thread, there may still need to be message traffic between the private cache and the next level of cache or a system memory controller, but there need not be any peer level cache snoop traffic.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Figure 2:
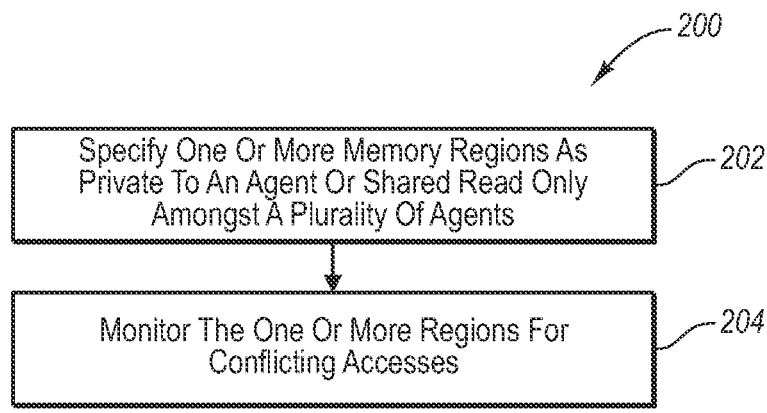
FIG. 2 illustrates a method of keeping a memory region private.

Referring now to FIG. 2, a method 200 is illustrated. The method 200 may be practiced in a computing environment including a plurality of agents. For example FIG. 1C illustrates a plurality of CPUs 102. FIG. 1D illustrates a plurality of threads 104. Other agents may also be implemented. The method 200 includes acts for declaring one or more memory regions private to a particular agent or shared read only amongst agents by having software utilize processor level instructions to specify to hardware the private or shared read only memory address regions. The method 200 includes an agent executing a processor level instruction to specify one or more memory regions as private to the agent or shared read-only amongst a plurality of agents (act 202). For example, a processor 102 may execute an instruction issued by software, the instruction included in the processor's instruction set architecture which causes the one or more memory regions to be declared as private to the processor 102 or as shared read-only amongst a plurality of processors 102. For example, the processor may execute the set RM or set WM instructions described above.

As a result of an agent executing a processor level instruction to specify one or more memory regions as private to the agent or shared read-only amongst a plurality of agents (act 202), a hardware component monitors the one or more memory regions for conflicting accesses (act 204). For example, in one embodiment a monitoring engine 148 may monitor the memory regions as described in more detail below. In an alternative embodiment, a cache 116 itself may include functionality for monitoring the memory regions (as cache lines) for conflicting accesses.

The method 200 may further include the hardware component (e.g. monitoring engine 148 or cache 116) detecting a conflicting access to the one or more memory regions, and as a result, providing software visible indicator indicating the conflicting access. For example, another agent may write or read data within a memory region that has had read or write monitoring set on it. The hardware component may detect this conflicting access and set LOSS_OF_RM 134 or LOSS_OF_WM 136.

In one embodiment of the method 200, an agent executing a processor level instruction to specify one or more memory regions as private to the agent or shared read-only amongst a plurality of agents may include setting a write monitor on the one or more memory regions. The write monitor causes hardware to detect read or write accesses by other agents. Setting a write monitor allows the agent to specify the one or more memory regions as private to the agent.

In an alternative embodiment of the method 200, an agent executing a processor level instruction to specify one or more memory regions as private to the agent or shared read-only amongst a plurality of agents may include setting a read monitor on the one or more memory regions. The read monitor causes hardware to detect write accesses by other agents. Setting the read monitor allows the agent to specify the one or more memory regions as shared read only amongst the plurality of agents.

The method of 200 may further include an agent executing a processor level instruction to specify a handler to which execution will transfer in the event that another agent performs a conflicting access to the one or more memory regions. For example, a processor may set an address in an ejection handler register 156 specifying an memory location of a next instruction to execute on LOSS_OF_RM 134 or LOSS_OF_WM 136. Embodiments may further include the hardware component detecting a conflicting access to the one or more memory regions, and as a result, jumping to the handler (e.g. jumping to the instruction at the address in the ejection handler register 156).

The method 200 may further be practiced where an agent executing a processor level instruction to specify one or more memory regions as private to the agent or shared read-only amongst a plurality of agents includes setting a write monitor on the one or more memory regions or setting a read monitor on the one or more memory regions. The one or more memory regions may be represented in a cache local to a processor. The method 200 may further include adding read or write monitoring indicator states to a cache state for each cache line in the cache. The method 200 may further include detecting a conflicting access to a monitored location's cache line, which is performed as a result of snooping by the using a cache coherence system for the cache, such that cache coherence state machine transitions can trigger a loss of monitoring for a monitored cache line. For example, a cache coherence state machine may transition between MESI indicator states. If a MESI indicator transitions from exclusive to invalid (for example) then this transition will cause a LOSS_OF_RM 134 or LOSS_OF_WM 136.

As noted, embodiments of the method 200 may be practiced where the hardware component comprises a separate monitoring engine, such as a monitoring engine 148. In one example of this embodiment, the one or more memory regions are represented in the monitoring engine. For example, the monitoring engine 148 may include a monitored region table for each of one or more agents. The entries include a set of monitored memory regions and monitoring states. In the example illustrated in FIG. 1C, the monitoring engine 148 may include a table correlating monitoring states (e.g. RM and WM per cache line) for the CPUs 102-4-102-7. The method 200 may further include detecting a conflicting access to a monitored location by: observing memory accesses by other agents and correlating them with the memory regions of the monitored region table, determining conflicting accesses, and providing a software visible indicator indicating the conflicting access, such as by setting LOSS_OF_RM 134 or LOSS_OF_WM 136 or by providing some other indicator.

Figure 3:
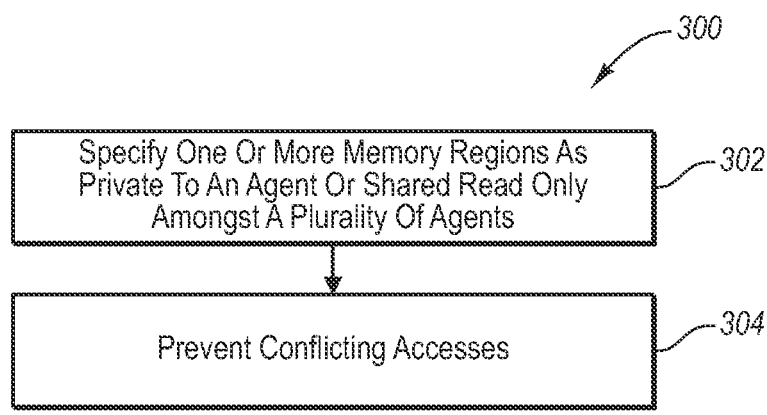
FIG. 3 illustrates a method of keeping a memory region private.

Referring now to FIG. 3, another method 300 is illustrated. The method 300 may be practiced in a computing environment including a plurality of agents. The method includes acts for enforcing one or more memory regions as private to a particular agent or shared read only amongst agents by having software utilize processor level instructions to specify to hardware the private or shared read only memory address regions. The method includes an agent executing a processor level instruction to specify one or more memory regions as private to the agent or shared read-only amongst a plurality of agents (act 302). For example a specialized version of set RM or set WM instruction may be executed by a processor 102. As a result of an agent executing a processor level instruction to specify one or more memory regions as private to the agent or shared read-only amongst a plurality of agents (act 302), a hardware component prevents conflicting accesses on the one or more memory regions by other agents.

The method 300 may be practiced where an agent executing a processor level instruction to specify one or more memory regions as private to the agent or shared read-only amongst a plurality of agents comprises setting an inviolable write monitor on the one or more memory regions. The inviolable write monitor causes hardware to prevent read or write accesses by other agents. The inviolable write monitor may be set by indicating in a specialized column similar to the WM column 130, but where setting the indicator indicates that any read or write requests should be denied. As will be discussed later herein, this denial may be accomplished by hardware issuing a notification such as a negative acknowledgement to a requesting agent.

Similarly, the method 300 may be practiced where an agent executing a processor level instruction to specify one or more memory regions as private to the agent or shared read-only amongst a plurality of agents includes setting an inviolable read monitor on the one or more memory regions. The inviolable read monitor causes hardware to prevent write accesses by other agents, while allowing read access by the other agents.

In some embodiments of the method 300 where executing a processor level instruction to specify one or more memory regions as private to the agent or shared read-only amongst a plurality of agents includes setting an inviolable write or setting an inviolable read monitor, the method may be practiced where the one or more memory regions are represented in a cache local to a processor. Embodiments may further include adding inviolable read and inviolable write monitoring indicator states to a cache state for each cache line in the cache. As noted, specialized columns similar to RM 128 and WM 130 may be implemented for inviolable read and write monitors. Embodiments may further include detecting a potentially conflicting access to a monitored location's cache line by a second agent. Detecting may be performed as a result of snooping by the using a cache coherence system for the cache. The method may further include returning to the second agent a negative acknowledgment indication denying access to the one or more cache lines in memory regions and thereby preventing the conflicting access. Such embodiments may be practiced where the second agent is a thread, and upon receiving the negative acknowledgment indication, the second agent performs an inviolable memory access violation fault. This fault may be used by software to appropriately handle the denial of access.

In some embodiments, the method 300 may be practiced where the hardware component includes a separate monitoring engine. The one or more memory regions may be represented in the monitoring engine. The monitoring engine may include a monitored region table for each of one or more agents. The entries may include a set of monitored memory regions and monitoring states. Preventing a conflicting access to a monitored location may be performed by observing memory accesses by a second agent and correlating them with the memory regions of the monitored region table, determining potentially conflicting accesses, and by returning to the second agent a negative acknowledgment indication denying access to the one or more memory regions and thereby preventing the conflicting access.

Figure 4:
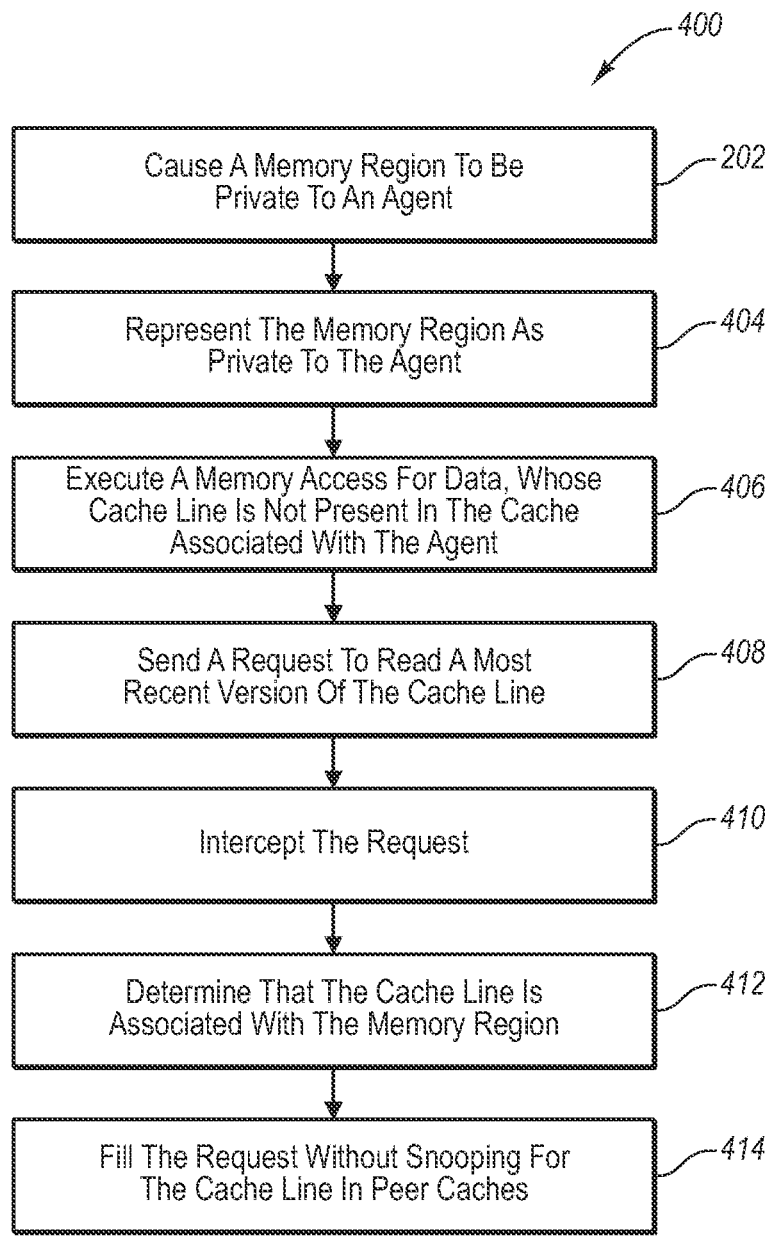
FIG. 4 illustrates a method of optimizing cache coherence.

Referring now to FIG. 4, another method 400 is illustrated. The method 400 may be practiced in a computing environment. The computing environment includes an agent in a multi-agent system. The agent is associated with a cache. The cache is implemented in a multi-level memory hierarchy with memory components higher in the multi-level memory hierarchy than the cache. For example, FIG. 1C illustrates caches 116 and higher level memory components including L2$s and DRAM. The agent is associated with a monitoring engine (e.g. monitoring engine 148). The method 400 includes acts for optimizing cache coherence message traffic volume, such as by for example eliminating unnecessary coherence traffic and cache snoop operations. The method 400 includes the agent executing a processor level software instruction causing a memory region to be private to the agent. For example set RM, set WM or some specialized version of these instructions may be executed.

As a result, the monitoring engine represents the memory region as private to the agent (act 404). For example, the monitoring engine may include a table which correlates cache lines to monitoring state and when a write monitor is indicated in the table for a cache line corresponding to the memory region, the memory region is represented as private in the monitoring engine.

The method 400 may include the agent then executing a memory access for data, whose cache line is not present in the cache associated with the agent, resulting in a cache miss condition (act 406). For example, a processor 102-4 may request data from the cache 116-4, but the data is not in the cache 116-4.

As a result, a request to read a most recent version of the cache line is sent up the memory hierarchy (act 408). For example in one embodiment, the cache 116-4 may send a request directed to higher level memory components.

The monitoring engine (e.g. 148-1 in the present example) intercepts the request(act 410). The monitoring engine (e.g. 148-1) determines that the cache line is associated with the memory region represented as private to the agent(act 412). For example, the monitoring engine 148-1 may have an entry in a table that shows the cache line is associated with a write monitor.

As a result, the cache line does not reside in a peer cache to the cache. As such the request is filled without resorting to snooping for the cache line in peer caches (act 414). In one embodiment, the request is filled without resorting to snooping for the cache line in peer caches by the monitoring engine signaling to the peer caches (e.g. caches 116-5-116-7) and to a cache coherence interconnect 158-1 and/or 158-2 that the request does not require cache snooping in peer caches, peer caches and the cache coherence interconnect being configured to receive the signal and as a result suppress cache snoop processing and further propagation of the request to other peer caches. The cache coherence interconnect comprises the signals that connect the various caches and agents together so that they may observe each others memory accesses.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment comprising a plurality of agents, each of the agents having local data caches comprising memory regions and using a cache coherence system including a cache coherence protocol to ensure that different copies of the same data on different local data caches do not conflict, a method of declaring one or more memory regions of a local data cache as private to a particular agent local to the data cache by having software use processor level instructions to specify to hardware the private memory address regions, the method comprising:

an agent executing a processor level instruction to specify a memory region of a local data cache local to the agent that is part of a cache coherence system having a plurality of peer level caches, each peer level cache being local to an agent but that participate in clustered or global cache coherence, as private to the agent such that the memory region is not able to be synchronized with other peer level caches in the cache coherence system such that data in the memory region private to the agent is not in any other peer level cache by specifying an address range of the local data cache that is private to the agent; and as a result of an agent executing a processor level instruction to specify the memory region of the local data cache as private to the agent, a hardware component monitoring engine adding the memory region to a table by adding an address range of the memory region in the local cache to the table indicating that the address range is private to the agent and the hardware component monitoring engine monitoring the one or more memory regions for attempts at conflicting accesses to the memory region by other agents using the cache coherence protocol.

2. The method of claim 1 wherein an agent executing a processor level instruction to specify a memory region as private to the agent comprises setting a write monitor on the memory region, wherein the write monitor causes hardware to detect attempts at read or write accesses by other agents, to specify the one or more memory regions as private to the agent.

3. The method of claim 1 wherein an agent executing a processor level instruction to specify a memory region as private to the agent comprises setting a read monitor on the memory region, wherein the read monitor causes hardware to detect attempts at write accesses by other agents, to specify the one or more memory regions as shared read only amongst the plurality of agents.

4. In a computing environment comprising a plurality of agents, each of the agents having local data caches comprising memory regions and using a cache coherence system including a cache coherence protocol to ensure that different copies of the same data on different local data caches do not conflict, a method of enforcing one or more memory regions of a local data cache as private to a particular agent local to the data cache by having software utilize processor level instructions to specify to hardware the private memory address regions, the method comprising:

an agent executing a processor level instruction to specify a memory region of a local data cache local to the agent that is part of a cache coherence system having a plurality of peer level caches, each peer level cache being local to an agent but that participate in clustered or global cache coherence, as private to the agent such that the memory region is not able to be synchronized with other peer level caches in the cache coherence system such that data in the memory region private to the agent is not in any other peer level cache by specifying an address range of the local data cache that is private to the agent; and as a result of an agent executing a processor level instruction to specify the memory region of the local data cache as private to the agent, a hardware component monitoring engine adding the memory region to a table by adding an address range of the memory region in the local cache to the table indicating that the address range is private to the agent and the hardware component monitoring engine preventing conflicting accesses on the one or more memory regions by other agents using the cache coherence protocol by killing or re-labeling a coherence message so as to eliminate any further peer level cache snoop traffic.

5. The method of claim 4 wherein an agent executing a processor level instruction to specify one or more memory regions as private to the agent comprises setting an inviolable write monitor on the one or more memory regions, wherein the inviolable write monitor causes hardware to prevent read or write accesses by other agents.

6. The method of claim 4 wherein an agent executing a processor level instruction to specify one or more memory regions as private to the agent comprises setting an inviolable read monitor on the one or more memory regions, wherein the inviolable read monitor causes hardware to prevent write accesses by other agents, while allowing read access by the other agents.

7. The method of claim 4, further comprising a second agent, the second agent being a thread, upon receiving the negative acknowledgment, performing an inviolable memory access violation fault.

8. A computing system, the computing system comprising:
a plurality of agents, each of the agents having local data caches comprising memory regions and using a cache coherence system including a cache coherence protocol to ensure that different copies of the same data on different caches do not conflict;

one or more processors;
one or more computer readable media coupled to the one or more processors, and comprising computer executable instructions that when executed by a processor cause one or more of the processors to perform the following:
an agent executing a processor level instruction to specify a memory region of a local data cache local to the agent that is part of a cache coherence system having a plurality of peer level caches, each peer level cache being local to an agent but that participate in clustered or global cache coherence, as private to the agent such that the memory region is not able to be synchronized with other peer level caches in the cache coherence system such that data in the memory region private to the agent is not in any other peer level cache by specifying an address range of the local data cache that is private to the agent; and as a result of an agent executing a processor level instruction to specify the memory region of the local data cache as private to the agent, a hardware component monitoring engine adding the memory region to a table by adding an address range of the memory region in the local cache to the table indicating that the address range is private to the agent and the hardware component monitoring engine preventing conflicting accesses on the one or more memory regions by other agents using the cache coherence protocol by killing or re-labeling a coherence message so as to eliminate any further peer level cache snoop traffic.

9. The system of claim 8 wherein an agent executing a processor level instruction to specify one or more memory regions as private to the agent comprises setting an inviolable write monitor on the one or more memory regions, wherein the inviolable write monitor causes hardware to prevent read or write accesses by other agents.

10. The system of claim 8 wherein an agent executing a processor level instruction to specify one or more memory regions as private to the agent comprises setting an inviolable read monitor on the one or more memory regions, wherein the inviolable read monitor causes hardware to prevent write accesses by other agents, while allowing read access by the other agents.

11. The system of claim 8, further comprising a second agent, the second agent being a thread, upon receiving the negative acknowledgment, performing an inviolable memory access violation fault.

12. The method of claim 1, wherein specifying an address range of the local data cache that is private to the agent comprises specifying at least one of a bit vector, a run length, or a hierarchical bit vector.

13. The method of claim 1, wherein specifying an address range of the local data cache that is private to the agent comprises specifying a base address and an extent.

14. The method of claim 8, wherein specifying an address range of the local data cache that is private to the agent comprises specifying a base address and an extent.

15. The method of claim 1, wherein the hardware component monitoring engine prevents conflicting accesses on the one or more memory regions by other agents using the cache coherence protocol by blocking coherence request messages.

16. The method of claim 1, wherein the hardware component monitoring engine prevents conflicting accesses on the one or more memory regions by other agents using the cache coherence protocol by modifying coherence request messages.

17. The method of claim 1, wherein the hardware component monitoring engine prevents conflicting accesses on the one or more memory regions by other agents using the cache coherence protocol by blocking all access by other agents.

18. The method of claim 1, wherein the hardware component monitoring engine prevents conflicting accesses on the one or more memory regions by other agents using the cache coherence protocol by allowing read only access by other agents.

19. The method of claim 1, wherein the hardware component monitoring engine is implemented on a per processor basis such that each hardware component monitoring engine is implemented for a different processor.

20. The method of claim 1, wherein the hardware component monitoring engine is implemented with a single monitor for a cluster of processors.

\* \* \* \* \*